United States Patent [19]

McAndrews

[11] Patent Number: 5,011,349
[45] Date of Patent: Apr. 30, 1991

[54] TAILGATE MOUNTED CARGO RETAINING DEVICE

[76] Inventor: Glenn McAndrews, 402 E. Warren St., Lebanon, Ohio 45036

[21] Appl. No.: 496,650

[22] Filed: Mar. 21, 1990

[51] Int. Cl.⁵ .......................... A44B 11/06; B60P 7/04
[52] U.S. Cl. ................................ 410/102; 24/68 CD; 24/197; 410/106
[58] Field of Search .................. 410/96, 101, 102, 106, 410/107, 110, 111, 112; 24/68 CD, 197, 196, 200

[56] References Cited

U.S. PATENT DOCUMENTS

| | | | |
|---|---|---|---|
| 2,866,248 | 12/1958 | Reno | 24/248 |
| 3,404,438 | 10/1968 | Goldman | 24/201 |
| 3,429,537 | 2/1969 | Jantzen | 248/223 |
| 3,439,390 | 4/1969 | Prete, Jr. | 24/201 |
| 3,465,393 | 9/1969 | Fisher | 24/230 |
| 3,477,104 | 11/1969 | Lewis | 24/201 |
| 3,486,203 | 12/1969 | Cadiou | 24/196 |
| 3,608,159 | 9/1971 | Brucker | 24/201 |
| 3,765,063 | 10/1973 | Farley | 24/201 |
| 3,814,029 | 6/1974 | McNally et al. | 410/111 |
| 3,831,532 | 8/1974 | Smith et al. | 410/111 X |
| 4,011,974 | 3/1977 | Scarola | 224/42.1 |
| 4,121,849 | 10/1978 | Cristopher | 280/179 R |
| 4,184,234 | 1/1980 | Anthony et al. | 24/196 |
| 4,219,236 | 8/1980 | Takada | 24/196 X |
| 4,248,558 | 2/1981 | Lechner | 410/110 X |
| 4,315,350 | 2/1982 | Looker et al. | 24/197 X |
| 4,531,773 | 6/1985 | Smith | 296/26 |
| 4,611,961 | 9/1986 | Van Iperen et al. | 410/101 X |
| 4,630,982 | 12/1986 | Fenner | 410/102 |
| 4,648,765 | 3/1987 | Kovaleski et al. | 410/110 |
| 4,818,162 | 4/1989 | Zukowski et al. | 410/116 |
| 4,842,458 | 6/1989 | Carpenter | 410/3 |
| 4,903,378 | 2/1990 | Kasai | 24/196 |

Primary Examiner—David A. Bucci
Assistant Examiner—Robert S. Katz

[57] ABSTRACT

This invention generally relates to load securing devices and in particular to an end connector member (10) having a lower portion (11) in the form of a flat metallic or like plate having a penetrable latch tongue aperture (14) contained therein for releaseably engaging the locking mechanism of a truck tailgate. An upper portion (13), integrally joined with said lower portion (11) is provided in the form of a circular ring or rectangular plate for securably attaching the ends of cargo restraining straps (28) or strap anchored end attaching means (32). The combination of connector (10) and straps (28) is employed for preventing both rearward and transverse motion of cargo carried in the bed of a truck when the length of that cargo reequires that the truck tailgate body (20) be used in the lowered horizontal position.

18 Claims, 3 Drawing Sheets

TAILGATE MOUNTED CARGO RETAINING DEVICE

BACKGROUND—FIELD OF INVENTION

This invention generally relates to apparatus used to restrain movement of cargo in transit and in particular to vehicle cargo strap end connectors.

BACKGROUND—DESCRIPTION OF PRIOR ART

Operators of pick-up trucks often lower the truck's tailgate into the horizontal position in order to accommodate extended cargo. Forces such as acceleration will tend to move the cargo rearward with respect to the truck. The problem faced by the operator of such a vehicle is that the truck having no upright tailgate to act as an endwall is subject to the cargo inadvertently sliding out of the truck bed compartment. Accordingly, it is common practice to lash the cargo securely in place so that it is substantially immovable. Webbing, straps, or rope, suitably wrapped around the cargo are widely used to restrict the cargo's movement. In such use, it is necessary that the straps be fixedly attached to the vehicle body. Likewise, it is required that the straps be quickly and easily fastened and released. These requirements challenge the vehicle operator to locate anchoring points on the vehicle body for the straps or rope.

In recognition of this problem prior art suggests numerous cargo restraining apparatus. For trucks transporting extended loads it has been suggested to use truck bed extension devices. These methods are undesirable due to the complexity of arrangements, bulkiness, and significant cost of such devices. U.S. Pat. No. 4,121,849 to Christopher (1978) shows a device that cooperably with the truck's sidewall will clamp the cargo against the truck bed floor. This device suffers from being complicated, hard to install, and bulky.

Numerous U.S. patents reveal vehicle cargo straps and the like. Tie down devices for trucks are discussed in U.S. Pat. No. 2,866,248 to Reno (1958) and U.S. Pat. No. 4,818,162 818 to Zukowski (1989). These Patents as well as numerous others show devices that are designed for specific anchoring arrangements, none of which are suitable for cooperable attachment to a truck tailgate latch.

OBJECTS AND ADVANTAGES

Accordingly, a principal object of my invention is to provide a cargo retaining device, cooperable with common truck tailgate latching mechanisms. Used in this way, a convenient anchor point is provided on the tailgate platform for straps to securably retain cargo in the bed of the truck. Other objects and advantages of this invention are:

(a) to provide a cargo retaining device that in combination with straps having additional end attaching means, and length adjusting means will enable operators of trucks to carry extended cargo in a secure and safe manner.

(b) to provide a cargo retaining device that is easily stowable, for example behind the seat of the vehicle.

(c) to provide a device that is quickly attached or detached from the vehicle.

(d) to provide a device of simple design and manufacture, easy to use and inexpensive to purchase.

Still further objects and advantages will become apparent from a consideration of the ensuring description and drawings.

BRIEF DESCRIPTION OF THE DRAWINGS

In the drawings similar reference characters have been employed to designate corresponding parts throughout the several views.

FIG. 4 shows an end connector with an L shaped plate upper section having apertures for receiving buckles and the like.

DETAILED DESCRIPTION OF THE PREFERRED EMBODIMEMT

Figure 1:
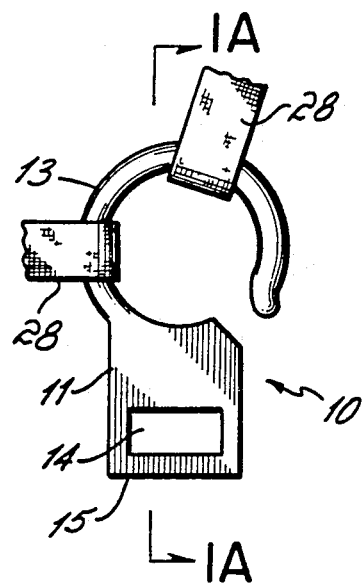
FIG. 1 shows a side view of an end connector provided with an open ended circular ring upper portion.
Figure 1A:
FIG. 1A shows a sectional view of an end connector as noted in FIG. 1.

In accordance with the first embodiment of the invention, as shown in FIG. 1, the device comprises principally an end connector 10 and straps 28 attached thereto.

Figure 2:
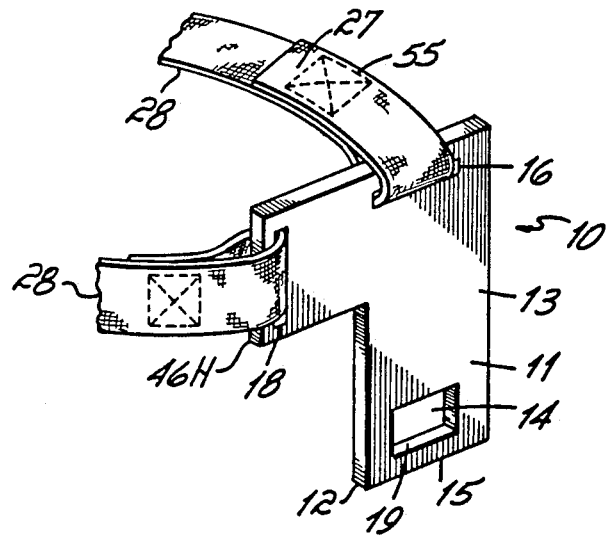
FIG. 2 shows an end connector with a rectangular flat plate upper section having slots for permanently attaching straps.
Figure 3:
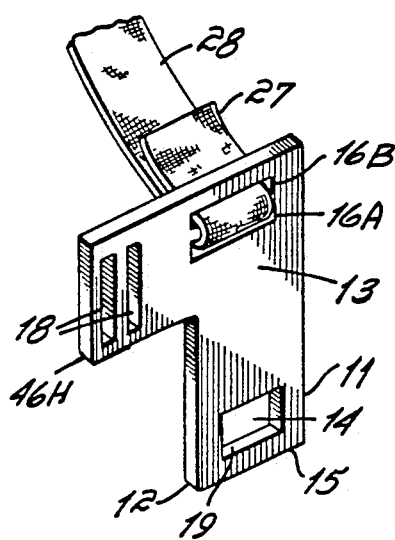
FIG. 3 shows an end connector with a rectangular flat plate upper section with slots for releaseably attaching straps.
Figure 4:
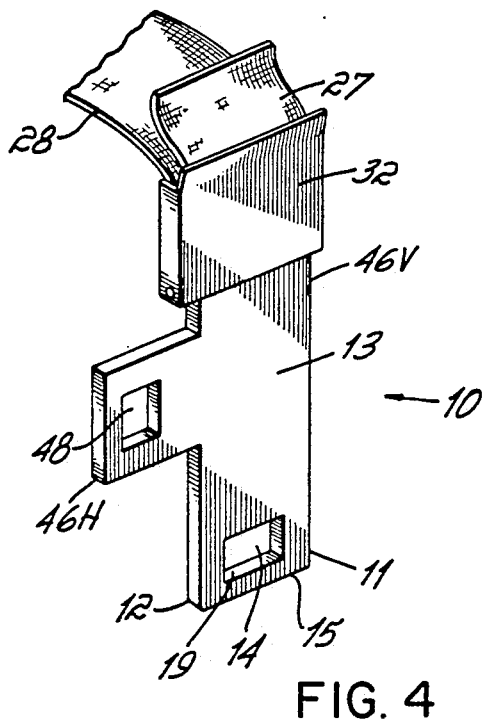
Figure 5:
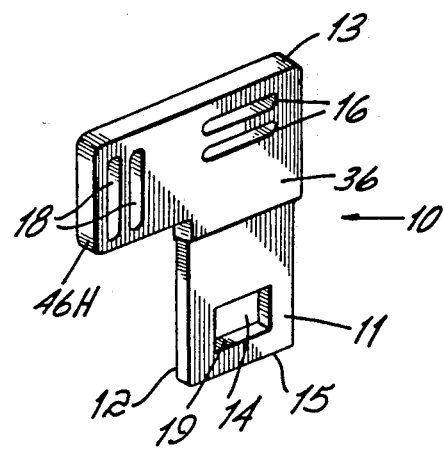
FIG. 5 shows an end connector provided with a resilient coating for purposes of preventing strap wear.
Figure 6:
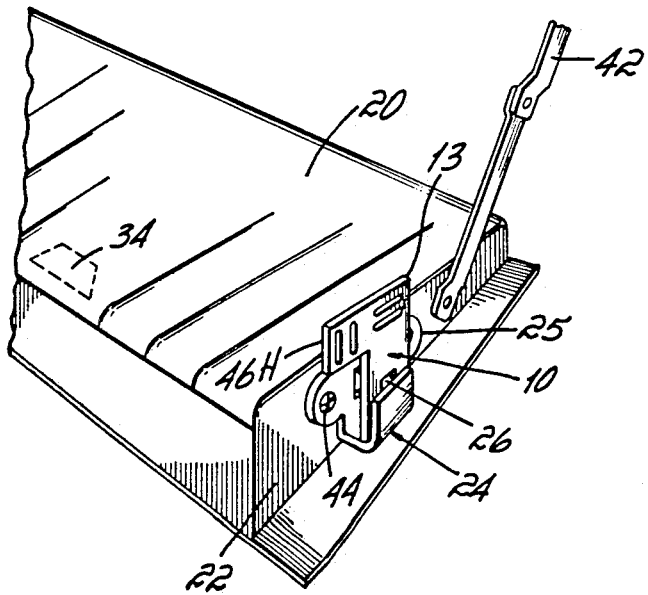
FIG. 6 shows a detailed view of an end connector in cooperation with a tailgate latch mechanism.
Figure 7:
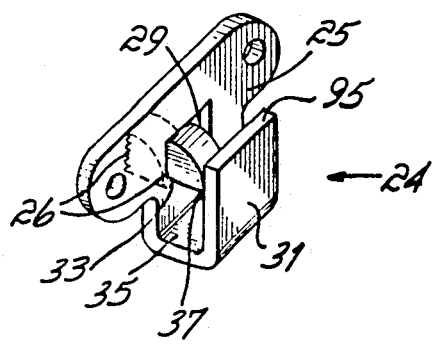
FIG. 7 shows a detailed view of a tailgate backplate fixture.
Figure 8:
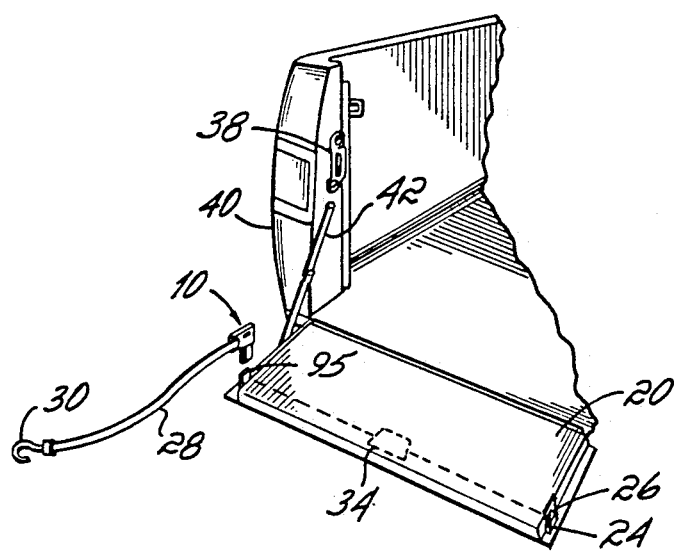
FIG. 8 shows an end connector being inserted into the tailgate latch mechanism.
Figure 9:
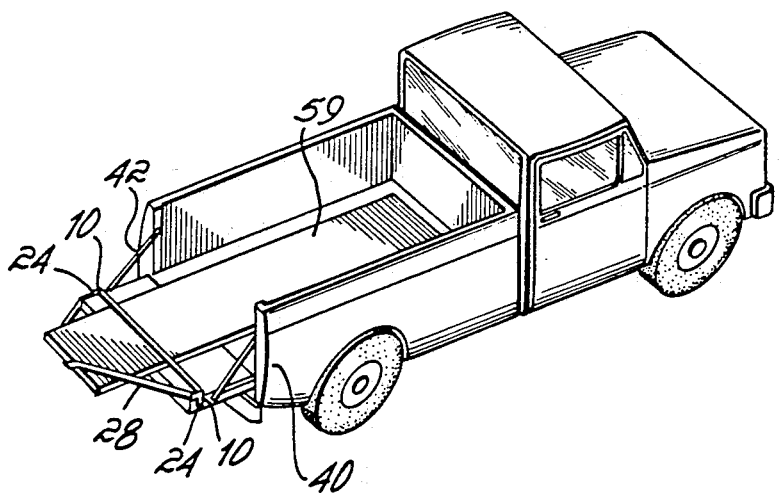
Fig. 9 shows the invention being employed to secure flat extended cargo on a truck bed.
Figure 9A:
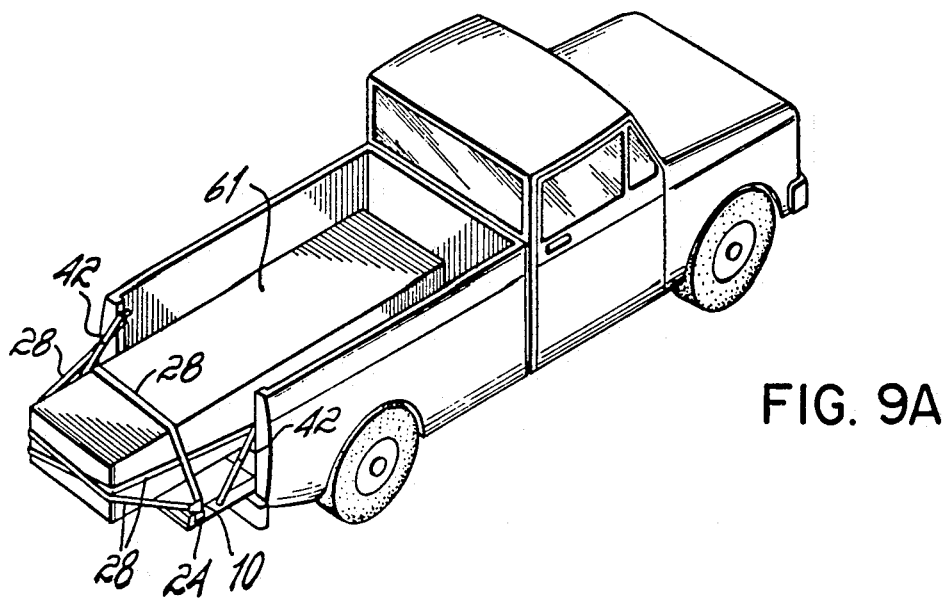
FIG. 9A shows the invention being employed to secure bulky extended cargo on a truck bed.

The connector 10 further comprises an upper portion 13, in this view an open-ended circular ring, integrally joined or formed with a lower portion 11. Lower portion 11 further includes a latch tongue receiving aperture 14 provided therethrough. Embodiments of the invention shown in FIG. 2 through FIG. 5 show lower portion 11 having a tapered inboard facing surface 12 extending from the connector bottom edge 15 directly upwards generally not past the lower surface 19 of aperture 14. Also shown in FIG. 2 through FIG. 5 are lugs 46H,46V generally aligned with their principal axes in the horizantal or vertical directions, extensibly formed or joined with the upper portion 13. FIG. 2 shows a horizontal slot 16 in upper portion 13 securing a permanently attached strap 28. In this case, a free end 27 of strap 28 has been sewn back onto the strap 28 with, for example nylon thread 55 after having engaged the slot 16. Likewise, a vertical slot 18 is provided in horizontal lug 46H for permenent attachment of strap 28. FIG. 3 shows upper portion 13 having a plurality of horizontally aligned slots 16A,16B provided therethrough. Likewise, horizontal lug 46H has a plurality of vertically aligned slots 18 provided therethrough. Suitable dimensions of the slots are provided in accordance with the thickness and width of the attached strap 28 for releaseably attaching strap 28. Referring now to FIG. 4, both horizontal lug 46H and vertical lug 46V have receiving apertures 48 provided therethrough. Strap anchored end buckle 32 similar to the quick release buckle used to restrain automobile and airline passengers having length adjusting means (said means not shown) is attached to vertical lug 46V by engaging aperture 48 (not shown). FIG. 5 shows still another embodiment of connector 10 having a resilient coating 36 applied to all surface of upper portion 13, horizontal lug 46H, and inside surfaces of the slots 16,18. FIG. 6 shows a detailed view of end connector 10 in application with a truck tailgate body 20. The connector 10 is of metallic plate construction, for example but not limited by, a one piece iron casting. The plate thickness should be suitable for cooperative insertion into a backplate fixture 24. Referring to FIG. 7, the plate thickness should not be more than the distance between the outboard flange surface 25, and the inboard surface 27 of a backing plate tower 31. Likewise, the distance between the lower surface 19 of latch aperture 14 and the bottom edge 15 of connector 10, should not be more than the distance between the lower surface 33 if a backplate latch aperture 29 and the bottom surface 35 of backplate fixture 24. Not included as part of the invention, backplate fixture 24 is normally screwed into a sidewall 22 of tailgate body 20 with the use of mounting screws 44. Backplate latch aperture 29 is provided in fixture 24 to allow the passage of a retractable tailgate latch tongue 26 emanating from the internal cavity of tailgate body 20. Also not part of the invention but necessarily described, tongue 26 shown in FIG. 6, FIG. 7, and FIG. 8 is one member of the normal tailgate locking system. The combination of tongue 26 having a tip 37, fixture 24, a body mounted strike plate 38, and a latch mechanism 34 comprises the system for normal locking of tailgate body 20 in the upright vertical position. As shown in FIG. 6 and FIG. 8 the lowered tailgate body 20 is supported by struts 42 that fixedly attach to a vehicle body 40. Thus the lowered tailgate body 20 provides a stable platform suitable for mounting the invention as shown in Fig. 9. FIG. 9 shows the transport of a flat board 59. Two straps 28 are being employed in combination with the mounted connector 10. FIG. 9A shows the transport of a box 61 using three straps 28, the ends of two straps 28 being attached to the vechicle body 40. FIG. 8 shows that suitable end attaching devices can be incorporated with the strap 28, for example a simple hook 30.

The manner in which the invention is used will now be discussed. FIG. 1 shows how the upper portion 13 in the shape of an open-ended ring allows straps 28 with loop ends (said loop ends not shown) to be secured around to circumference of the upper portion 13. FIG. 3 shows the strap free end 27 is threaded, first into lower slot 16A then reversably inserted through top slot 16B. The insertion of strap 28 into the connector 10 by the operator of such a device is avoided with permanently attached straps 28 as shown in FIG. 2. FIG. 4 shows where the vehicle operator will simply combine strap 28 and connector 10 through the use of a strap anchored attaching buckle 32 having length adjusting means (said means not shown).

As shown in FIG. 6 and FIG. 8 connector 10 is inserted vertically downward in the space between the outboard flange face 25 of the backplate fixture 24 and the inboard face 27 of backplate tower 31. The normal rested position of tongue 26 is outward such that the tip 37 of tongue 26 will contact the inboard face 27 of backing plate tower 31. This outward locked position being maintained by the spring force of the tailgate latch mechanism 34. To facilitate insertion of connector 10 past tongue 26 the tapered surface 12 of lower portion 11 upon contact with tongue 26 provides an inwardly directed force opposing the tailgate latch mechanism spring force. Similar to the conventional coaction with the body mounted strike plate 38, for purposes of locking tailgate body 20 in the upright postion, tongue 26 responds to this force by inwardly retracting into tailgate body 20. The retraction of tongue 26 permits continued downward insertion of connector 10 until such time that latch aperture 14 having sufficient penetrable area permits the outward passage of tongue 26 through latch aperture 29, returning tongue 26 to its normally extended postion. With connector 10 now securably locked into the combination of tongue 26 and backplate fixture 24 any forces imposed upon connector 10 as a result of being connected to the cargo (said cargo not shown) through straps 28 will produce forces on tongue 26 principally in shear. The tongue 26 is required to withstand shear forces in its conventional capacity of locking tailgate body 20 in the upright position and will do so also in the new capacity of anchoring connector 10. Disengagement of connectr 10 from the locking combination of tongue 26 and backplate fixture 24 is accomplished by operating the tailgate handle (said handle not shown) of latch mechanism 34 as would normally be done when releasing tailgate body 20 into the lowered horizontal position from the upright vertical position.

The cargo retaining device as shown in FIG. 8, FIG. 9, and FIG. 9A can be used to retain a wide variety of cargo types. In FIG. 8, a strap anchored cargo attaching hook 30 is attached to the strap 28 for purposes of engaging a vehicle body mounted fixture such as strike plate 38, or it may be directly attached to a fixture mounted on the cargo, for example an eyehook on the bow of a canoe (said cargo mounted fixture not shown). The actual selection of strap types, strap end attachments, and strap length adjusting devices should not be limited by the embodiments presented herein.

Accordingly, the reader will see the invention provides many advantages to operators of trucks and the like when carrying cargo in a truck with the tailgate in the lowered position. The invention provides ready engagement and disengagement of the end connector and in combination with the tailgate latch tongue and backplate provides a convenient anchor point for straps and the like. Additional advantages include:

(a) a simply designed and manufactured device
(b) an inexpensive device
(c) an easily stowable device
(d) an easily installed device requiring no tools
(e) a device allowing flexibility of strapping arrangements.
(f) a quickly detached device requiring the simple pull of a truck tailgate handle Although the description above contains many specificities, these should not be construed as limiting the scope of the invention, but as merely providing ilustrations of some of the presently preferred embodiments of this invention. For example the end connector could employ other strap attachment means such as protruding pins or hooks. Likewise, the connector could have numerous shapes and sizes. For example the upper portion in FIG. 1 could be a closed-end ring. Persons skilled in the art might realize that a simple solid ring could replace the entire end connector, however the rectangular lower portion with latch aperture offers a more stable anchoring arrangement. Thus the scope of the invention should be determined by the appended claims and their legal equivalents, rather than by the examples given above.

I claim:

1. A device for securably retaining cargo in a vehicle having a tailgate with latches on opposing sides of said tailgate, each of said latches including a latch tongue and a backplate fixture, in circumstances where the tailgate of the vehicle is lowered into a horizontal postion, said device comprising:

a plurality of straps; and two end connector members for fastening said straps and engaging a respective latch, each end connector member including an upper portion with strap attaching means,, a lower portion being integral with said upper portion, and a latch tongue receiving aperture located in said lower portion, said latch receiving aperture having sufficient penetrable area to releaseably engage a tailgate latch tongue; and whereby each end connector member is releaseably engagable into said respective latch, during said engagement each said tongue extendably penetrates said respective aperture and coacts with said respective backplate fixture, and whereby said cargo is retained by said straps when said straps are attached to said end connector members and said end connector members are engaged with said respective latches to fixedly attach the end connector members to said tailgate.

2. The device of claim 1, wherein each said upper portion comprises a generally, circular ring of solid cross section.

3. The device of claim 1, wherein each said upper portion comprises a generally retangular flat plat.

4. The device of claim 3, further including a plurality of strap attaching means on each said end connector member.

5. The device of claim 1, further including a resilient coating applied to the surfaces of each said upper portion.

6. The device of claim 4, further including a resilient coating applied to the surfaces of each said upper portion.

7. The device of claim 1, wherein each of said straps include end attachment means for fastening a first end of each said strap to said strap attaching means.

8. The device of claim 7, wherein each of said straps include length adjustment means.

9. The device of claim 7, wherein each of said straps include end anchoring means for fastening the other end of each said strap to anchor fixture located on the cargo or the vehicle body.

10. The device of claim 9, wherein each of said straps include length adjustment means.

11. The device of claim 1, wherein each said lower portion is tapered.

12. The device of claim 1, wherein each said strap attaching means includes a plurality of slots for insertably receiving said straps.

13. The device of claim 4, wherein each said straps attaching means includes a plurality of slots for insertably receiving said straps.

14. The device of claim 4, wherein strap attaching means includes apetures for receiving a quick release buckle.

15. The device of claim 1, wherein each of said straps include permanent end attachment means for attaching a first end of each said strap to said strap attaching means.

16. The device of claim 15, wherein each of said straps include end anchoring means for fastening the other end of each said strap to anchor fixtures located on the cargo or the vehicle body.

17. The device of claim 15, wherein each of said straps include length adjustment means.

18. The device of claim 16, wherein each of said straps include length adjustment means.

* * * * *